(12) United States Patent
Pinaud et al.

(10) Patent No.: US 12,330,706 B2
(45) Date of Patent: Jun. 17, 2025

(54) STEERING WHEEL WITH REAR-DETACHABLE AIRBAG MODULE

(71) Applicant: Autoliv Development AB, Vargarda (SE)

(72) Inventors: Jonathan Pinaud, Montamise (FR); Pierre Romand, Poitiers (FR)

(73) Assignee: Autoliv Development AB, Vårgårda (SE)

( * ) Notice: Subject to any disclaimer, the term of this patent is extended or adjusted under 35 U.S.C. 154(b) by 0 days.

(21) Appl. No.: 18/006,087

(22) PCT Filed: Jul. 13, 2021

(86) PCT No.: PCT/EP2021/069382
§ 371 (c)(1),
(2) Date: Jan. 19, 2023

(87) PCT Pub. No.: WO2022/017858
PCT Pub. Date: Jan. 27, 2022

(65) Prior Publication Data
US 2023/0286567 A1    Sep. 14, 2023

(30) Foreign Application Priority Data

Jul. 21, 2020  (FR) ..................................... 2007643

(51) Int. Cl.
*B62D 1/10*    (2006.01)
*B60R 21/203*    (2006.01)

(52) U.S. Cl.
CPC .............. *B62D 1/10* (2013.01); *B60R 21/203* (2013.01)

(58) Field of Classification Search
CPC ......... B62D 1/10; B60R 21/20; B60R 21/203; B60R 21/2035; B60R 21/2037
(Continued)

(56) References Cited

U.S. PATENT DOCUMENTS 6,655,742 B1 * 12/2003 Ozaki ................... B60N 2/818
297/410
2003/0173759 A1    9/2003 Grenier
(Continued)

FOREIGN PATENT DOCUMENTS

CN    102137776 A  *  7/2011  ............. B60Q 5/003
CN    110654341 A  *  1/2020  ........... B60R 21/203
(Continued)

OTHER PUBLICATIONS

Description Translation for DE 29806933 from Espacenet (Year: 1998).*
(Continued)

*Primary Examiner* — Jason D Shanske
*Assistant Examiner* — Daniel M. Keck
(74) *Attorney, Agent, or Firm* — Matthew D. Thayne; Thayne and Davis LLC

(57) ABSTRACT

A vehicle steering wheel comprising a safety module, such as an airbag module, devices for attaching the safety module to the steering wheel, comprising at least one elastic member, such as a ring, engaged with a retaining part, such as a hook, to retain the safety module on the steering wheel, a through-opening for a tool for disengaging the elastic member, the through-opening being arranged on the side opposite the safety module, and comprising a support portion arranged to provide support to the disengagement tool, so as to have a lever arm.

16 Claims, 3 Drawing Sheets

(58) Field of Classification Search
USPC .................................................. 280/728.2
See application file for complete search history.

(56) References Cited

U.S. PATENT DOCUMENTS

| | | | |
|---|---|---|---|
| 2005/0023804 A1 | 2/2005 | Hauer et al. | |
| 2020/0001816 A1 | 1/2020 | Ducardonnet et al. | |
| 2023/0322289 A1* | 10/2023 | Bertrand | B60K 35/29 |
| | | | 29/894.1 |

FOREIGN PATENT DOCUMENTS

| | | | | |
|---|---|---|---|---|
| DE | 29806933 U1 | 7/1998 | | |
| DE | 20311760 U1 | 12/2003 | | |
| DE | 102009050893 A1 | 4/2011 | | |
| DE | 102013013352 A1 | 4/2014 | | |
| DE | 102019116869 A1 | 1/2020 | | |
| EP | 1354770 A2 | 10/2003 | | |
| FR | 3119584 A1 * | 8/2022 | ......... | B60R 21/2037 |
| WO | WO-2011054449 A1 * | 5/2011 | ......... | B60R 21/2035 |
| WO | WO-2014024703 A1 * | 2/2014 | ............ | B60Q 5/003 |
| WO | WO-2020053323 A1 * | 3/2020 | ........... | B60R 21/203 |
| WO | WO-2021001307 A1 * | 1/2021 | ........... | B60R 21/203 |
| WO | WO-2022206113 A1 * | 10/2022 | | |

OTHER PUBLICATIONS

Description Translation for WO 2020053323 from Espacenet (Year: 2020).*

Description Translation for DE 20311760 from Espacenet (Year: 2003).*

* cited by examiner

[Fig. 1]
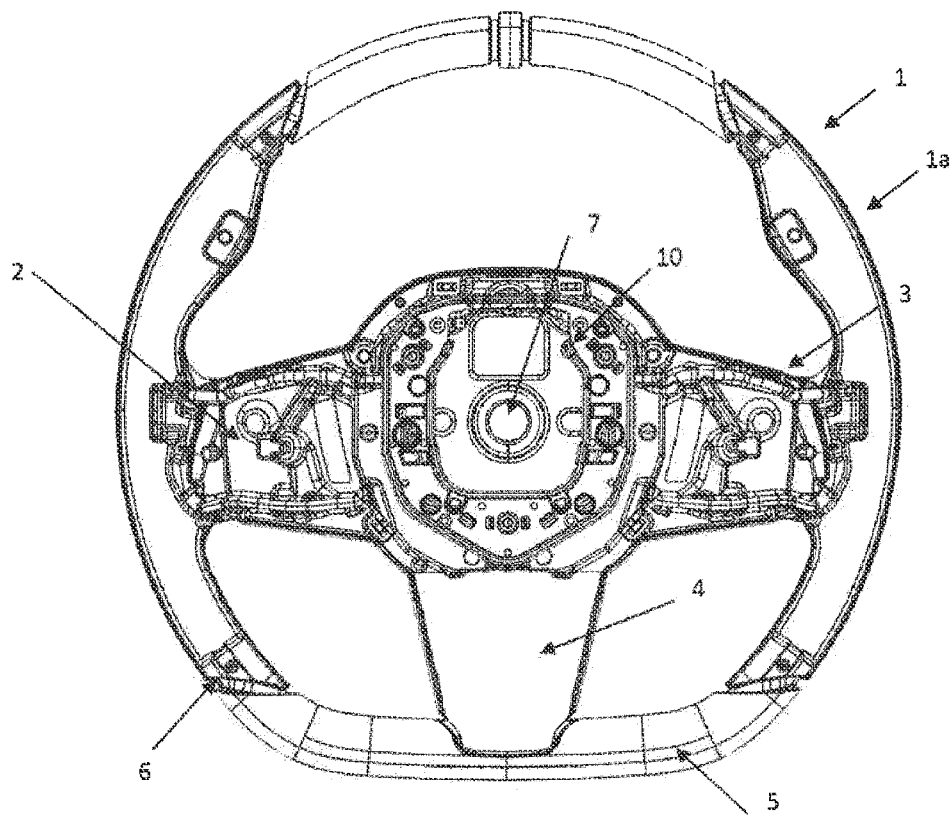
[Fig. 2]
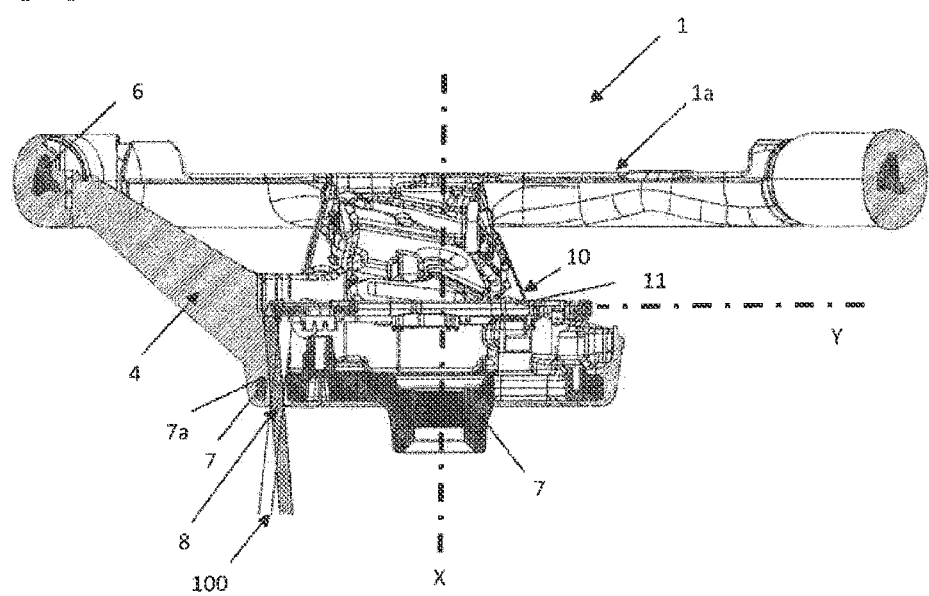

[Fig. 3]
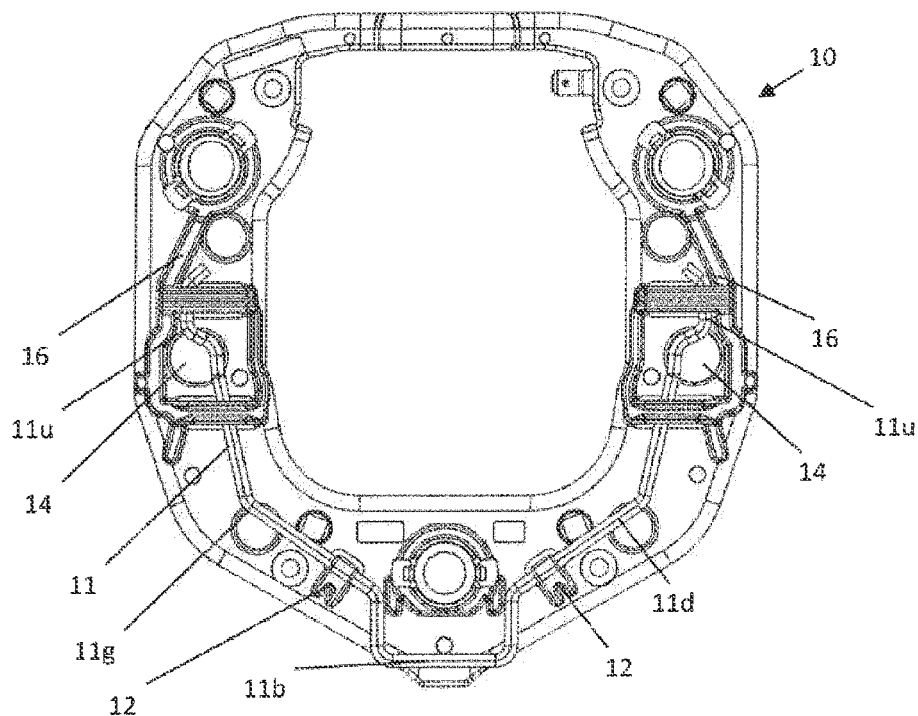
[Fig. 4]
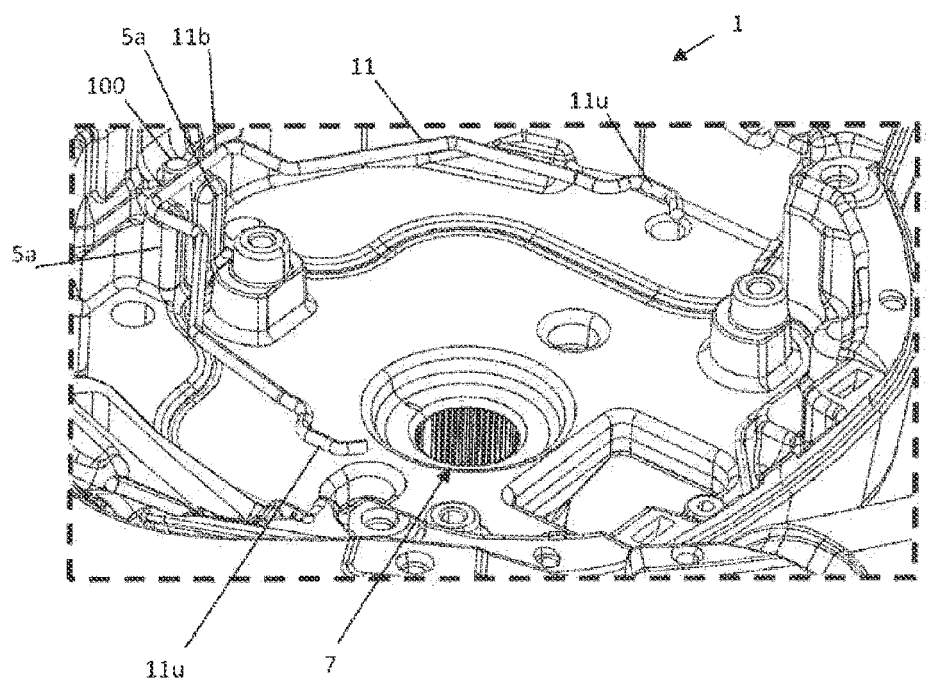

[Fig. 5]
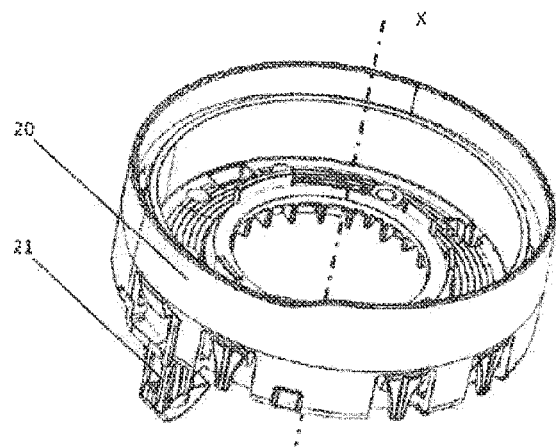
[Fig. 6]
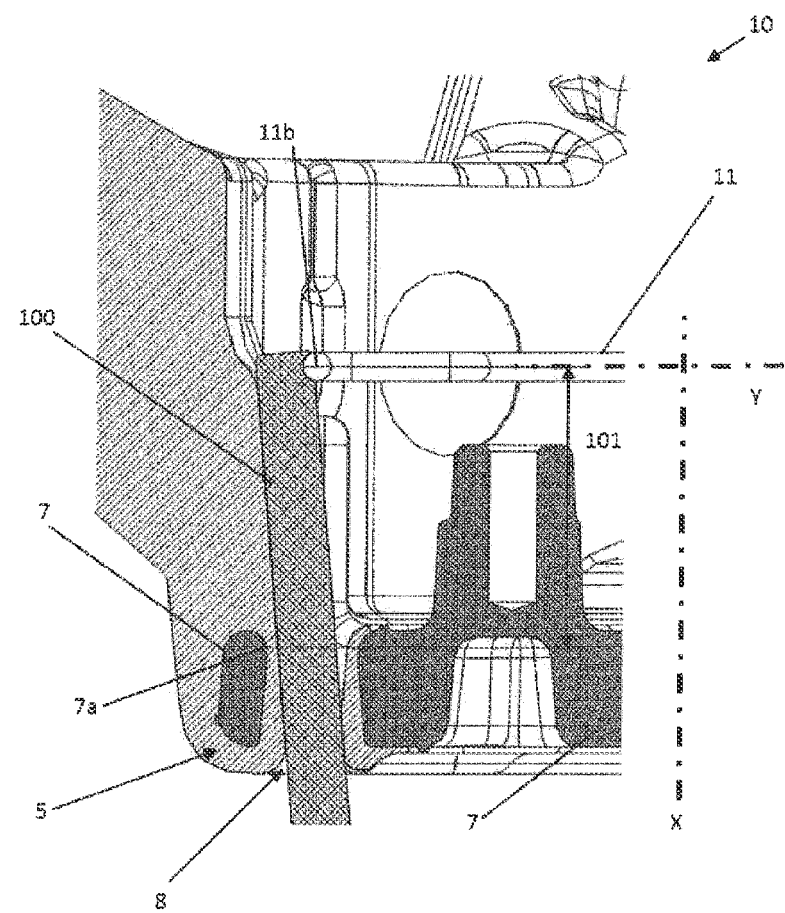

STEERING WHEEL WITH REAR-DETACHABLE AIRBAG MODULE

The present invention generally relates to a steering wheel equipped with an airbag module.

Known in the prior art are steering wheels equipped with an airbag module.

Document US2003173759 describes an arrangement for removably mounting an airbag module on a steering wheel. The arrangement comprises a mounting plate which defines apertures for receiving the feet of an airbag unit. The plate is provided with a spring that extends through the apertures to provide a snap fit. When a thrust force is exerted on a determined point of the spring, the spring moves in a predetermined manner and the portions of the spring are guided so that they no longer go beyond the corresponding apertures, thus making it possible to release the module. The pushing force in order to unlock the spring is applied in the same plane as the main plane of the spring, which can cause incorrect manipulations during the unlocking operation.

One aim of the present invention is to respond to the disadvantages of the document of the prior art mentioned above and in particular to propose a vehicle steering wheel equipped with a removably mounted airbag module whereof the distance needed to travel to unlock the airbag module is reduced, the disassembly (or "unclasping", that is to say unlocking) whereof is facilitated by maintaining retention forces of the safety module that is compatible with the running of the vehicle and the correct operation of the safety module, and whose aperture necessary for the introduction of a disengagement tool is hidden for reasons of safety and aesthetics.

A first aspect of the invention therefore relates to a vehicle steering wheel comprising:
- a safety module, such as an airbag module,
- devices to attach the safety module to the steering wheel comprising at least one elastic member, such as a snap ring, arranged in a position of engagement with a retaining part, such as a hook or an attaching base, to hold the safety module on the steering wheel,
- a through-opening for a disengagement tool to disengage the elastic member, arranged on one side of the steering wheel opposite to the safety module, and comprising a support portion arranged to provide a bearing to the disengagement tool, so as to allow a user to form a lever arm with the disengagement tool.

This makes it possible, during an operation of disassembling the safety module, to easily disassemble the safety module, with access from the rear of the steering wheel in order to guarantee safety and aesthetics. The useful distance for the disengagement tool (and/or the elastic member) to travel in order to disengage the elastic member from the retaining part is thus reduced. Furthermore, thanks to the lever arm, the disengagement force is high on the elastic member and is not applied to the area of the elastic member in contact with the retaining part(s), thereby improving the disassembly of the safety module. The disengagement is thus generated by a translation of the part of the elastic member on which the disengagement tool acts, which allows high precision and reliability in the disassembly of the safety module. The engagement position makes it possible to retain the safety module in the event of triggering while allowing functional play if necessary.

Advantageously, the through-opening can be arranged to allow an insertion of the disengagement tool along an axis intersecting a movement plane of the elastic member to disengage the safety module.

Advantageously, the through-opening can be arranged in a section of the steering wheel or a surface of the steering wheel defined by the projection of the safety module on the steering wheel according to the mounting direction of the safety module. Preferably, the mounting direction of the safety module is parallel to the axis of the steering column connected to the steering wheel or to an axis of rotation of the steering wheel.

Advantageously, the movement plane of the elastic member to disengage the safety module can be distinct from a movement plane of the disengagement tool.

This makes it possible to facilitate disassembly from the rear of the safety module.

Advantageously, the vehicle steering wheel may comprise a single through-opening, preferably a single through-opening.

Advantageously, the through-opening can be arranged so as to allow disengagement of the elastic member from the retaining part at a single force point, preferably a single central force point.

This makes it possible to facilitate the disassembly of the safety module at a single point, and therefore in a single action of a removal operator, which is easy, quick and intuitive for the disassembly operator.

Advantageously, the vehicle steering wheel may comprise at least one guide wall or at least one guide plane arranged to provide guidance to the disengagement tool during the operation of disengaging the elastic member. In particular, said or at least one wall or said at least one guide plane may be arranged between the through-opening and the elastic member in order to guide the disengagement tool and to avoid incorrect insertion. In some embodiments, the guide planes are defined by flat surfaces.

Advantageously, the vehicle steering wheel may comprise one or more guide elements arranged to provide guidance to the disengagement tool in a plane during the operation of disengaging the elastic member. The disengagement operation is facilitated because the tool cannot deviate from the plane wherein it must move in order to move the elastic member.

Advantageously, the vehicle steering wheel may comprise a plurality of guide walls and/or guide planes arranged to provide guidance to the disengagement tool during the operation of disengaging the elastic member. In particular, the guide walls or planes may be arranged between the through-opening and the elastic member, and/or extend along a direction of insertion of the disengagement tool into the steering wheel at the start of the operation of disengagement of the elastic member, and/or form a passage groove or a through-groove or a well for getting the disengagement tool into the steering wheel at the start of the operation of disengaging the elastic member.

Advantageously, said or at least one guide wall or said at least one guide plane may be formed by foaming of the steering wheel, and/or by a plastic material, and/or by a frame of the steering wheel.

It should be noted that said at least one guide wall can have any shape, and just like said at least one guide plane, this makes it possible to guide the end of the disengagement tool directly and easily toward the portion of the elastic member to be actuated to remove the safety module. Thus, the operator is assisted by said or at least one guide wall or said at least one guide plane to directly find the right position of the disengagement tool before actuating the elastic member.

Advantageously, a disengagement torque of the disengagement tool can cause a translation of the elastic member, so as to disengage the elastic member from the retaining part.

This makes it possible to achieve easy, rapid and intuitive disassembly of the safety module.

Advantageously, the support portion can be arranged at 24 millimeters±10 millimeters from the elastic member in a direction of the axis of rotation of the steering wheel or a steering column axis connected to the steering wheel, preferably 24 millimeters±5 millimeters from the elastic member, very preferably 24 millimeters±2 millimeters from the elastic member.

Advantageously, the support portion can be arranged at more than 20 millimeters from the elastic member along the direction of the steering column axis linked to the steering wheel, preferably more than 25 millimeters, very preferably more than 30 millimeters.

This makes it possible to provide a lever arm between the disengagement tool and the elastic member sufficient to allow easy, rapid and reliable disassembly of the elastic member, while retaining a reasonable disengagement distance for the tool to travel and guaranteeing the safety of the disassembly of the safety module and the safety of the operator during handling.

Advantageously, the translation of the elastic member during disengagement with the retaining part may be greater than 4 millimeters, preferably greater than 5 millimeters, very preferably greater than 6 millimeters.

This makes it possible to guarantee reliable disassembly of the safety module.

Advantageously, the vehicle steering wheel may further comprise a hub, and the through-opening is arranged in the hub of the steering wheel. The hub is the part of the steering wheel to which at least one branch is connected and which comprises an interface for connection with an axis of rotation of the steering wheel such as a steering column.

Advantageously, the vehicle steering wheel may comprise a frame comprising a rim connected to a hub by at least one branch, and an area of the hub is arranged to attach the steering wheel to a vehicle steering member.

Advantageously, the frame may comprise only branches arranged at 3 o'clock and 9 o'clock.

This makes it possible to propose a vehicle steering wheel having easy, rapid and reliable disassembly, with a frame making it possible to stiffen the vehicle steering wheel while arranging the through-opening in a central zone at 6 o'clock.

Advantageously, the vehicle steering wheel may further comprise a foam enveloping at least part of the hub, the through-opening passing through the hub and the foam.

This makes it possible to propose a steering wheel whose foam lengthens the guidance of the disengagement tool during the disassembly operation.

Advantageously, the vehicle steering wheel may further comprise a frame forming a skeleton of the steering wheel, the steering wheel further comprising a plate movable in translation, such as a horn plate, supporting the elastic member and attached to the frame.

Advantageously, the plate is arranged to serve as a stop for the disengagement tool. Typically, the plate serves as a stop in the insertion direction of the disengagement tool.

This makes it possible to propose a steering wheel with a simplified, intuitive and rapid disassembly of the security module.

In one embodiment:
the elastic member may present a general U shape,
the through-opening is arranged in a central position, on the base side of the general U shape,
the steering wheel further comprises at least one stop part, and
the retaining part is arranged between at least one stop part and the base of the general U shape,
so as to allow disassembly at a single central effort point.

The elastic member is thus easy to disengage from the retaining part and the disassembly (or "unclasping", i.e. unlocking) of the safety module is facilitated.

Advantageously, the retaining part is arranged between the stop part and the elastic member, so as to allow disengagement of the retaining part with the elastic member when the disengagement tool is pressed on the support portion.

Advantageously, the vehicle steering wheel may further comprise a guiding part arranged between the through-opening and the stop part, so as to guide the elastic member when the disengagement tool is pressed on the support portion.

This makes it possible to facilitate disengagement of the elastic member with the retaining part and to facilitate the disassembly of the safety module.

Advantageously, the elastic member may further present a local U shape on the retaining part, so as to amplify the movement of the elastic member when the disengagement tool is pressed on the support portion, so as to allow disengagement of the retaining part from the elastic member.

The U-shape and the associated plies make it possible to facilitate the sliding of the elastic member on the stop part so as to facilitate the disassembly of the safety module.

A second aspect of the present invention relates to a motor vehicle comprising a vehicle steering wheel according to the first aspect.

This makes it possible to propose a motor vehicle with a safety module that is easy to dismantle, reliably and effectively, while ensuring attractive aesthetics. The reduced distance necessary for the disengagement tool to travel to disengage the elastic member makes the removal operator's work easier.

Advantageously, the motor vehicle may further comprise a column trim panel, and
the column trim panel is removable and the through-opening is hidden by the column trim panel when the column trim panel is mounted, or
the through-opening is hidden by the column trim panel when the steering wheel is in a predetermined position, preferably in a neutral position.

This makes it possible to protect access to the through-opening for safety and aesthetic reasons.

Other characteristics and advantages of the present invention will become more apparent upon reading the detailed description of an embodiment of the invention, which is provided by way of example but in no manner limited thereto, and illustrated by the attached drawings, in which:

FIG. 1 shows a front view of a vehicle steering wheel according to the present invention, FIG. 2 shows a cross-sectional and elevation view of the vehicle steering wheel according to the present invention, FIG. 3 shows a detail view of a movable plate of the vehicle steering wheel, carrying an elastic snap ring, FIG. 4 shows a detail view of the vehicle steering wheel with the elastic snap ring being approached by a disengagement tool, FIG. 5 shows a perspective view of a steering wheel safety module housing, FIG. 6 shows a cross-sectional and elevation view of the vehicle steering wheel during a step of disengaging the elastic snap ring by the disengagement tool.

FIG. 1 shows a front view of a vehicle steering wheel 1.

FIG. 1 shows a vehicle steering wheel 1, with a vehicle steering wheel frame 1a, that is the skeleton or framework intended to support the other components of the vehicle steering wheel (typically the overmolding or foam 5, the cladding parts, control members such as the horn control, buttons, a safety module 20 shown in FIG. 5, etc.). According to the non-limiting example shown, the frame 1a comprises a hub 7, several branches 2, 3, 4, (here three, the number of branches not being limiting), and a rim 6 connected to the hub 7 by the branches 2, 3, 4.

The frame 1a can be made of magnesium, for example. It is possible to provide added, screwed, welded or overmolded parts for the different components of the frame 1a.

The frame 1a is then typically partially overmolded to conceal the metal parts from the driver, in particular at the branches 2, 3, 4 and the rim 6.

FIG. 2 depicts a cross-sectional and elevation view of the steering wheel 1. The frame 1a is shown with the rim 6 and the hub 7. The branch 4 is formed only of foam but a frame reinforcement is also conceivable. The steering wheel 1 further comprises a plate 10 movable in translation along a steering column axis X of a steering column of the vehicle connected to the steering wheel 1 via an area for attachment of the hub 7. The plate 10 is used, in the shown example, as a horn plate. The mounting plate 10 carries an elastic member 11, such as an elastic snap ring 11. The elastic ring 11 serves to retain or fasten a safety module 20, such as an airbag, a safety module housing of which is shown in FIG. 5. The elastic ring 11 is arranged to engage with at least one retaining part 21, such as retaining hooks 21 or retaining feet, shown on the safety module housing in FIG. 5. The elastic member 11 and the retaining part 21 together form the attachment device or attachment interface, allowing the securing and fastening of the safety module 20 to the steering wheel 1. When the safety module housing 20 is installed on the steering wheel 1, the elastic member 11 is in contact with the retaining part 21 such that the safety module housing 20 is held on the steering wheel 1. It is necessary to dismantle the safety module 20 after it is activated (for example triggering the airbag in the event of an accident of the vehicle) and to change the safety module 20. This is achieved by the disengagement of the elastic member 11 from the retaining part 21 and the re-engagement of a new safety module.

As shown in FIG. 2, the elastic member 11 is formed by an elastic ring 11 with a circular cross-section made of spring steel, but a spring blade or elastic tabs, made of metal or another material, may be provided.

The hub 7 comprises a through-opening or orifice 8 arranged to receive a disengagement tool 100. The through-opening 8 is arranged on the side opposite the safety module 20. In other words, with reference to FIG. 2, the safety module is mounted on top (i.e. the front face of the steering wheel 1, facing the driver who can take the steering wheel in their hands to drive) and the through-opening 8 is arranged on the opposite side. Thus, the through-opening 8 is arranged on the steering wheel 1 on the side of the steering column (at the bottom, with reference to FIG. 2).

A disassembly operator seeking to disassemble the safety module 20 can thus introduce the disengagement tool 100, typically in a direction substantially parallel to the axis X, in the through-opening 8 via the rear face of the steering wheel 1 and thus disengaging the elastic ring 11 from the retaining part 21.

The disengagement tool 100 is shown in FIG. 2 in two positions. The first position (with hatching) is the position of the disengagement tool 100 during the insertion of the disengagement tool 100 into the through-opening 8. The second position (without hatching) is the position after the operator pivots the disengagement tool 100 in order to disengage the elastic ring 11 from the retaining part 21.

The operator thus applies a disengagement torque and the disengagement torque is transformed into a translation of the elastic ring 11 along the axis Y, perpendicular to the axis of the steering column X. The elastic ring 11 can thus move in a plane comprising the axis Y, preferably perpendicular to the axis X.

The hub 7 thus comprises a support portion 7a at the through-opening 8 which makes it possible to support the disengagement tool 100, so as to form a lever arm between the support portion 7a and the elastic ring 11, thus facilitating the disengagement of the elastic ring 11 with the retaining part 21, and allowing easy disassembly of the safety module 20.

This makes it possible to have a suitable lever arm, a compromise between a reasonable disengagement distance between the first position and the second position of the disengagement tool 100 and a dismantling force acceptable to the operator. This also makes it possible to transmit significant forces to the elastic ring 11 during disengagement and thus to facilitate the disassembly of the safety module 20 while ensuring excellent fastening of the safety module 20 while the motor vehicle is running.

In an advantageous embodiment, the plate 10 also serves as a stop during the insertion of the disengagement tool 100 making it possible to avoid any contact between the tool and another element of the steering wheel 1 which could be degraded.

FIG. 3 shows a detail view of the movable plate 10 in translation of the vehicle steering wheel 1, carrying the elastic ring 11.

The elastic ring 11 has a general U shape, with two branches 11g, 11d connected by a base 11b. The elastic ring 11 further comprises two portions 11u having a local U shape arranged so as to stiffen the structure and ensure a translation of the elastic ring 11 during the removal operation.

The plate 10 further comprises two holes 14 arranged to receive the retaining parts 21 of the housing of the safety module 20. The elastic ring 11 is arranged near these holes 14 in order to be able to engage with the retaining parts. In other words, the elastic ring extends through the holes or apertures 14 to provide attachment by snap-fastening of the retaining parts 21.

The plate 10 further comprises stop parts 16 arranged opposite the ends of the elastic ring 11 and the portions 11u locally in the shape of a U.

The plate 11 further comprises retaining hooks 12 in order to correctly hold the elastic ring 11 on the plate 10, in particular when the safety module is released.

When the disengagement tool 100 is pressed on the base 11b of the elastic ring 11 and a disengagement torque is applied by the operator, the elastic ring 11 moves in the main plane of the mounting plate 10 and abuts against the stop parts 16. The elastic ring 11 is attached by hooks 12 to the plate 10. The general U shape is thus curved and the two ends 11g, 11d of the elastic ring move closer together so as to release the retaining parts 21 from their engagement with the elastic ring 11. This allows easy disassembly of the housing of the safety module 20 at a single point.

FIG. 4 shows a detail view of the vehicle steering wheel 1 with the elastic ring 11 brought closer by the disengagement tool 100.

The disengagement tool is brought closer to the base 11b of the elastic ring 11. A disengagement torque by the operator makes it possible to disengage the elastic ring 11 from the retaining parts 21.

In FIG. 4, the steering wheel 1 is shown with its hub 7 and the elastic ring 11 with the portions 11u locally in the shape of a U, while the plate 10 is hidden, for ease of comprehension. Two vertical walls or flanges 5a are formed, for example, by the foam 5 on either side of the tool 100 in order to assist with the guidance of the tool 100, which thus remains more easily guided in a plane during the movement of the elastic ring 11. This facilitates the disassembly operation. These two vertical walls or flanges or guide elements 5a thus form a guide well for assisting with the guidance of the tool 100 which cannot be incorrectly inserted and will directly face the portion of the elastic ring 11 to be actuated. The operator directly makes the correct gesture, without being wrong about the position or having to repeat the operation many times before finding the correct position of the tool 100 in order to actuate the elastic ring 11. In addition, these two vertical walls or flanges or guide elements 5a guide the tool 100, at least partially, for the actuation of the elastic ring 11. Advantageously, the tool 100 is guided during the entire movement of the elastic ring 11. In other words, the tool 100 is framed by the two vertical walls or flanges or guide elements 5a during the pivoting movement to make a lever, so that the risks of loss of contact, sliding, or scraping on the ring 11 are reduced.

FIG. 5 shows a safety module housing 20 which is mounted on the steering wheel 1 and supported by the frame 1a. Typically, the safety module further comprises a cover forming an external part, a gas generator and an airbag, not shown.

In order to fasten the safety module housing 20 and the safety module on the frame 1a and onto the steering wheel 1, the attachment device or attachment interface is provided as explained above and notably comprises the retaining part 21, such as a hook (or retaining hook) arranged to engage with the elastic member, namely the elastic ring 11.

In the example of FIG. 5, two hooks 21 are provided, diametrically opposed relative to the mounting axis of the safety module 20, which is also preferably the axis of the steering column X to which the steering wheel 1 is connected.

FIG. 6 shows a cross-sectional and elevation view of the steering wheel 1 during a step of disengaging the elastic snap ring 11 by the disengagement tool 100.

The disengagement tool 100 can bear on the support portion 7a of the hub 7, when it is introduced into the through-opening 8.

A distance 101 between the support portion 7a and the median plane of the elastic ring 11 is preferably 24 millimeters±10 millimeters along the steering column axis X, preferably 24 millimeters±5 millimeters from the elastic member, very preferably 24 millimeters±2 millimeters from the elastic member.

In an advantageous embodiment, the distance 101 between the support portion 7a and the median plane of the elastic ring 11 is preferably greater than millimeters.

This makes it possible to have a lever arm suitable for an acceptable dismantling force for the operator while maintaining sufficient travel to allow disengagement of the safety module 20 between the first position and the second position of the disengagement tool.

In an advantageous embodiment, the through-opening 8 is open, i.e. it passes entirely through the hub 7 and/or the foam 5, which simplifies the manufacture of the frame 1a.

The steering wheel 1 comprising a foam 5, and it is also possible to bear on the foam 5 during the actuation of the disengagement torque by the operator.

In an advantageous embodiment, the vehicle comprises a column trim panel masking the through-opening 8. In order to disassemble the safety module 20, it is then necessary to remove this trim panel.

In an advantageous embodiment, when the safety module 20 is dismantled, the operator must turn the steering wheel 1 so that the steering wheel 1 is not in the neutral position, and access the through-opening 8.

It will be understood that various modifications and/or improvements which are obvious for the person skilled in the art may be made to the different embodiments of the invention described in this present description without departing from the scope of the invention defined by the appended claims.

In particular, reference is made to adaptations of the shape of the elastic ring 11. Reference is also made to the possibility of providing the elastic ring 11 on board the safety module 20 and the retaining parts 21 on board the plate 10.

Reference is also made to the possibility of fixing the elastic snap ring to another part than the plate 10.

The invention claimed is:

1. A vehicle steering wheel comprising:
 a safety module,
 devices to attach the safety module to the steering wheel comprising at least one elastic member arranged in a position of engagement with a retaining part to hold the safety module on the steering wheel,
 a through-opening for a disengagement tool to disengage the at least one elastic member, arranged on one side of the steering wheel opposite to the safety module, and comprising a support portion arranged to provide a bearing to the disengagement tool, so as to allow a user to form a lever arm with the disengagement tool, and
 two walls or flanges forming guide planes for the disengagement tool to provide guidance to the disengagement tool in a plane during an operation of disengaging of the at least one elastic member, wherein the guide planes are defined by flat surfaces.

2. The vehicle steering wheel according to claim 1, wherein the support portion is arranged 24 millimeters±10 millimeters from the at least one elastic member according to a direction of a rotation axis of the steering wheel.

3. The vehicle steering wheel according to claim 1, further comprising a hub, and wherein the through-opening is arranged in the hub of the steering wheel.

4. The vehicle steering wheel according to claim 3, further comprising a foam enveloping the support portion, the through-opening passing through the hub and the foam.

5. The vehicle steering wheel according to claim 1, further comprising a frame forming a skeleton of the steering wheel, the steering wheel further comprising a plate movable in translation supporting the at least one elastic member and attached to the frame.

6. The vehicle steering wheel according to claim 5, wherein the plate is arranged to serve as an abutment for the disengagement tool.

7. The vehicle steering wheel according to claim 1, wherein:

the at least one elastic member presents a generally U-shape, the through-hole is arranged in a central position, on a base side of the generally U-shape, the steering wheel further comprises at least one stop part, and the retaining part is arranged between at least one stop part and the base side of the generally U-shape, so as to allow disassembly at a single central effort point.

8. The vehicle steering wheel according to claim 7, wherein the retaining part is arranged between the at least one stop part and the at least one elastic member, so as to allow disengagement of the retaining part with the at least one elastic member when the disengagement tool is pressed on the support portion.

9. The vehicle steering wheel according to claim 7, wherein the at least one elastic member further presents a local U-shape on the retaining part, so as to amplify the movement of the at least one elastic member when the disengagement tool is pressed on the support portion, so as to allow disengagement of the retaining part from the at least one elastic member.

10. A motor vehicle comprising a vehicle steering wheel according to claim 1.

11. The vehicle steering wheel according to claim 1, wherein the guide planes are positioned in between the through-opening and the at least one elastic member.

12. The vehicle steering wheel according to claim 1, wherein the guide planes are parallel to one another.

13. A vehicle steering wheel comprising:
a safety module;
at least one elastic member arranged in a position of engagement with a retaining part to hold the safety module on the steering wheel;
a through-opening for a disengagement tool to disengage the at least one elastic member, wherein the through-opening is arranged on one side of the steering wheel opposite to the safety module, and wherein the through opening comprises a support portion arranged to provide a bearing to the disengagement tool, so as to allow a user to form a lever arm with the disengagement tool; and
guide planes for the disengagement tool arranged between the through-opening and the at least one elastic member, wherein the guide planes are defined by a separate structure from a structure defining the through-opening.

14. A vehicle steering wheel comprising:
a safety module;
at least one elastic member arranged in a position of engagement with a retaining part to hold the safety module on the steering wheel;
a through-opening for a disengagement tool to disengage the at least one elastic member, wherein the through-opening is arranged on one side of the steering wheel opposite to the safety module, and wherein the through opening comprises a support portion arranged to provide a bearing to the disengagement tool, so as to allow a user to form a lever arm with the disengagement tool; and
guide planes for the disengagement tool arranged between the through-opening and the at least one elastic member, wherein the guide planes are configured to provide guidance in a single direction to the disengagement tool in a plane during an operation of disengaging of the at least one elastic member.

15. The vehicle steering wheel of claim 14, wherein the single direction is confined within a plane defined by the guide planes.

16. The vehicle steering wheel of claim 14, wherein the guide planes are defined by flat surfaces.

* * * * *